United States Patent Office 3,647,858
Patented Mar. 7, 1972

3,647,858
PROCESS FOR PREPARING 1-BENZYLIDENE-
3-INDENYL ACETIC ACIDS
David F. Hinkley, Plainfield, and John B. Conn, Westfield,
N.J., assignors to Merck & Co., Inc., Rahway, N.J.
No Drawing. Continuation-in-part of application Ser. No.
878,210, Nov. 19, 1969. This application May 1, 1970,
Ser. No. 33,977
Int. Cl. C07c *143/52*
U.S. Cl. 260—470     3 Claims

ABSTRACT OF THE DISCLOSURE

Process for preparing 1-benzylidene-3-indenyl acetic acids by condensing a benzylphenyl ketone. Also included are novel diphenylbutyrates and diphenylcaproates.

---

This application is a continuation-in-part of U.S. Ser. No. 878,210, filed Nov. 19, 1969, now abandoned.

This invention relates to a process for preparing novel compounds of the formula:

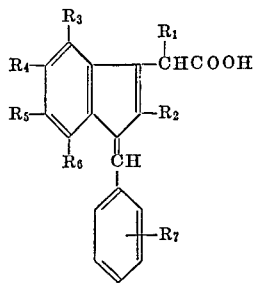

wherein:

$R_1$ may be hydrogen, loweralkyl or halogenated loweralkyl;
$R_2$ may be hydrogen or loweralkyl;
$R_3$, $R_4$, $R_5$ and $R_6$ each may be hydrogen, loweralkyl, loweralkoxy or halogen; and
$R_7$ may be loweralkylsulfinyl or loweralkylsulfonyl.

This invention further relates to intermediate compounds for the preparation of these 3-indenyl acetic acids and to processes for preparing said intermediates.

The 3-indenyl acetic acid compounds prepared by the process of this invention have anti-inflammatory, antipyretic and analgesic activity and are useful in the treatment of diseases which exhibit pain, fever or inflammation. In the treatment of such diseases these compounds may be administered topically, orally, rectally or parenterally in dosage ranges of from about 0.1 mg. to 50 mg./kg. body weight per day (preferably from about 1 mg. to 15 mg./kg. body weight per day).

In the past, other 1-benzylidene-3-indenyl acetic acids have been prepared by condensing a substituted benzaldehyde with a substituted acetic acid ester in a Claisen reaction or with an α-halogenated propionic acid ester in a Reformatsky reaction. The resulting unsaturated ester was reduced and hydrolyzed to give a β-aryl propionic acid which was ring closed to form an indanone. The aliphatic acid side chain was then introduced by a Reformatsky or Wittig reaction and the I-substituent was introduced into the resultant indenyl acetic acid or ester by reacting said acetic acid derivative with an aromatic aldehyde or ketone of the desired structural formula and dehydrating to form the desired indenyl acetic acid.

It is therefore an object of this invention to produce 1-benzylidene-3-indenyl acetic acid compounds by the processes of this invention which comprise the formation of substituted benzylphenyl ketones which may then be condensed to form substituted diphenyl butyric esters which in turn may be cyclized to form substituted indanones and then undergo a Reformatsky condensation to produce a substituted indanyl ester which may be dehydrated to produce the 3-indenyl acetic acid compounds which may then be substituted in the 1-position. Alternatively, the ketones may undergo a Reformatsky condensation to produce a 3-oxo - 5 - hydroxy-(4-methyl or 2,4 - dimethyl)-(substituted)-diphenylcaproate which then undergoes cyclodehydration to produce the 3-indenyl aliphatic esters which may then be saponified to the free acids.

It should be noted by one skilled in the art that these compounds may be isomerized into their cis and trans isomers by procedures well known in the art. The cis isomer is that isomeric form in which the benzylidene function is aligned under the phenyl ring of the indene nucleus. It should be further noted that the cis isomer is generally substantially more active than the trans isomer.

It should be further noted by one skilled in the art that the 1 - (p-methylsulfinylbenzylidene) - 3 - indenyl acetic acid compounds are asymmetric and may be resolved into their (+) and (—) forms by procedures well known in the art.

It should be further noted by one skilled in the art that some of these compounds are polymorphic and may have more than one crystalline structure.

DETAILED DESCRIPTION

In the preparation of the 3-indenyl acetic acid compounds the synthesis begins with a substituted benzylphenyl ketone which is produced by a Freidel-Crafts reaction of a 4-substituted phenyl acetyl chloride with a substituted benzene. If desired the 4-methylthio group can be oxidized with periodate, peroxy compounds, or t-butyl hypochlorite to the RS-methylsulfinyl group. Further, the 4-methylthio and 4-methylsulfinyl functions can be oxidized to the methylsulfonyl by means of t-butylhydroperoxide in the presence of catalytic amounts of vanadates, titanates or molybdenylacetylacetonate.

In the next stage two alternative routes are presented which are discussed separately.

Route 1.—The ketones are condensed with an α-halopropionate ester via the Reformatsky procedure to yield a 3-hydroxy - 2 - methyl - 3,4 - (substituted diphenyl)-butyrate ester. Here again, the methylthio group can be oxidized to RS-methylsulfinyl and both may be oxidized to methylsulfonyl as explained above.

In the next step the diphenylbutyrate is cyclized to a 1-(substituted benzylidene)-substituted - 3 - indanone by means of polyphosphoric acid. The sulfur oxidation procedures referred to above may also be applied at this stage of the procedure if thought advantageous.

The third step involves a second Reformatsky condensation with either a halo acetate ester or α-halo-propionate ester to yield in turn a 1-(substituted benzylidene)-3-hydroxy-3-(substituted indanyl) acetate or α-propionate ester with the same options as to the oxidation of the sulfur as previously discussed.

The fourth and final step of the sequence is a dehydration of the above indanyl hydroxy esters with p-toluenesulfonic acid and calcium chloride to produce the 1-(substituted benzylidene) - 2 - methyl-(substituted)-3-indenyl acetic or α-propionic acid compounds in the form of esters which are subsequently saponified to form the free acids.

Route 2.—This procedure starts with a Reformatsky condensation of the starting ketones with either 3-oxo-4-halo-n-valerate ester or 3-oxo-4-halo-2-methylvalerate ester to produce the 3-oxo-5-hydroxy-(4-methyl or 2,4-dimethyl)-(substituted)-diphenylcaproate. This compound then undergoes a cyclodehydration with polyphosphoric acid to yield the above-mentioned 3-indenyl aliphatic esters which are then saponified to the free acids.

The racemic mixture which results when the methylsulfinyl compounds are produced by either of the two abovementioned routes may be resolved by numerous procedures, for example, by oxidation of a sulfide by means of an optically-active per-acid gives a significant yield of the optically-active sulfoxides. Optically-active per-acids which have been successfully used for this purpose are 1S-percamphoric, and R- and S-pera-α-methyl(1-naphthyl)acetic acid. Optical yields are greater when the oxidation is preformed at low temperatures, for example −50° C.

If it is desired to resolve the final 1-(p-methylsulfinylbenzylidene)-2-methyl-substituted-3-indenyl acetic or propionic acids and esters the well-established technique of zone refining may be used.

Equivalents $R_1$ may be hydrogen or loweralkyl;
$R_3$, $R_4$, $R_5$ and $R_6$ each may be hydrogen, loweralkyl, loweralkoxy or halogen;
SM may be methylthio, methylsulfinyl or methylsulfonyl; and
E may be any esterifying group.

FLOW SHEET 1

The substituted benzyl phenyl ketones

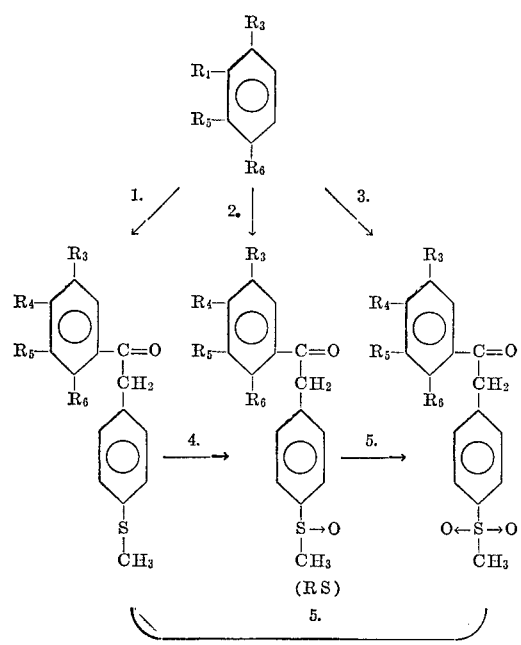

FLOW SHEET 2

Synthesis of indenylaliphatic acids from ketones

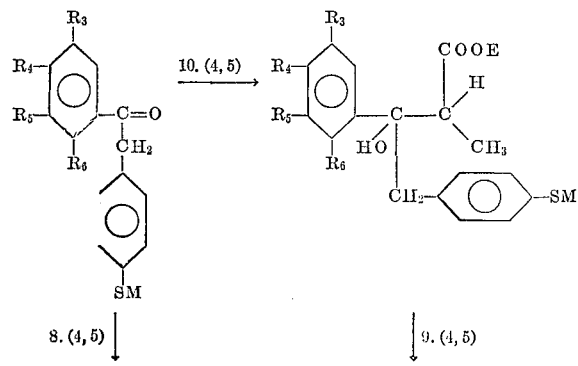

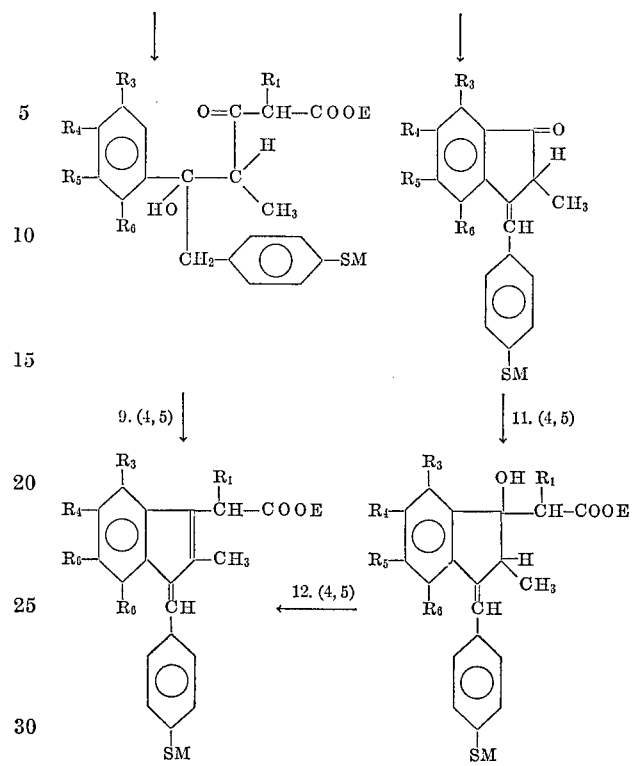

REAGENTS (1) 4-methylthiophenylacetyl chloride or bromide in presence of anhydrous aluminum chloride.
(2) 4-RS-methylsulfinylphenylacetyl chloride or bromide in presence of anhydrous aluminum chloride.
(3) 4-methylsulfonylphenylacetyl chloride or bromide in presence of anhydrous aluminum chloride.
(4) Oxidation with sodium metaperiodate, t-butyl-hypochlorite, or m-chloroperbenzoic acid in absence of oxygen-carrying catalyst.
(5) Oxidation with hydrogen peroxide or t-butyl-hydroperoxide in presence of a vanadate, titanium tetraalkoxide, or molybdenum acetyl acetonate catalyst.
(6) (4,5). Reformatsky condensation with 3-oxo-4-halovalerate ester or 3-oxo-4-halo-2-methylvalerate ester, in presence of zinc, with subsequent oxidation of sulfur according to (4) or (5), if desired.
(7) (4,5). Cyclodehydration with polyphosphoric acid and saponification followed by sulfur oxidation according to (4) or (5), if desired.
(8) (4,5). Reformatsky condensation with α-halo-propionic ester in presence of zinc, followed by sulfur oxidation, according to (4) or (5), if desired.
(9) (4,5). Reformatsky condensation in presence of zinc, with haloacetate or α-halo-propionate ester, followed by sulfur oxidation according to (4) or (5), if desired.
(10) (4,5). Dehydration with p-toluenesulfonic acid and saponification, followed by sulfur oxidation according to (4) or (5), if desired.

The following examples are presented to further illustrate the invention:

EXAMPLE 1

(A) 4-methylthiobenzyl,4′-fluorophenyl ketone

A solution of 48 g. (0.5 mole) fluorobenzene and 47 g. (0.25 mole) 4-methylthiophenylacetyl chloride in 500 ml. dry carbon disulfide is treated under stirring with 70 g. anhydrous aluminum chloride and allowed to remain for 24 hours at room temperature, at which time evolution of hydrogen chloride has ceased. Carbon disulfide and excess fluorobenzene are removed by distillation on the steam cone, and the residue is quenched in ice-water. The organic fraction is extracted with methylene chloride, dried over anhydrous calcium sulfate and distilled under reduced pressure to yield anhydrous calcium sulfate and distilled under reduced pressure to yield analytically pure 4-methylthiobenzyl,4'-fluorophenyl ketone.

The reactions of Example 1A are repeated using the same reaction conditions and techniques. Using the starting materials of Table I there are obtained the products of Table II.

Table I:                Table II

Chlorobenzene ———— 4-methylthiobenzyl,4'-chlorophenyl ketone.
o-Fluoranisole ———— 4-methylthiobenzyl,3'-fluoro,4'-methoxyphenyl ketone.
m-Difluorobenzene ———— 4-methylthiobenzyl,2',4'-difluorophenyl ketone.
o-Difluorobenzene ———— 4-methylthiobenzyl,3',4'-difluorophenyl ketone.

(B) Ethyl-3-hydroxy-2-methyl-[-3-(4'-fluoro)-4-(4''-methylthio)]-diphenylbutyrate In a one liter flask fitted with stirrer, reflux condenser, and dropping funnel is placed 39.4 g. (0.6 gram-atom) zinc dust. The dropping funnel is charged with a mixture of 200 ml. anhydrous benzene, 40 ml. absolute ether, 156.1 g. (0.6 mole) 4-methylthiobenzyl, 4'-fluorophenyl ketone, and 108.5 g. ethyl-2-bromopropionate. Approximately 25 ml. water is added to the zinc dust under vigorous stirring and the flask is warmed until the reaction starts after which heat is withdrawn and the remainder of the reactants introduced dropwise at such a rate as to maintain moderate refluxing. When the spontaneous reaction has subsided, heat is reapplied so as to maintain refluxing for another 30 minutes. The flask contents are cooled in ice and quenched with 300 ml. 10% sulfuric acid. The non-aqueous layer is separated, washed twice with 60 ml. portions of 5% sulfuric acid, then twice with 60 ml. portions of water. The aqueous phases are combined and shaken with two 60 ml. portions of ether. All organic extracts are thereafter combined and dried over anhydrous sodium sulfate. Evaporation of solvent and fractional distillation of the residue at 0.1 mm. yields pure ethyl-3-hydroxy-2-methyl-[3-(4'-fluoro)-4-(4''-methylthio)]-diphenylbutyrate.

The ketones produced in Example 1(A) may be reacted in accordance with the above procedure of Example 1(B) to produce the following esters:

Ethyl-3-hydroxy-2-methyl-[3-(4'-chloro)-4-(4''-methylthio-)]-diphenylbutyrate;
Ethyl-3-hydroxy-2-methyl-[3-(3'-fluoro-4'-methoxy)-4-(4''-methylthio-)]-diphenylbutyrate;
Ethyl-3-hydroxy-2-methyl-[3-(2',4'-difluoro)-4-(4''-methylthio-)]-diphenylbutyrate;
Ethyl-3-hydroxy-2-methyl-[3-(3',4'-difluoro)-4-(4''-methylthio-)]-diphenylbutyrate.

(C) 1-(4'-methylthiobenzylidene)-2-methyl-5-fluoro-3-indanone

Ethyl 3-hydroxy-2-methyl-[3-(4'-fluoro)-4-(4''-methylthio-)]-diphenylbutyrate (108.6 g., 0.3 mole) is added to 550 g. polyphosphoric acid at 50°, and the mixture is heated at 80–90% for 2 hours. The syrup is poured into ice-water, stirred for 0.5 hour, and then extracted with ether 3 times. The ether solution is washed twice with water and then with 5% sodium bicarbonate until the ether phase is neutral. The ether extract is dried over anhydrous sodium sulfate. The indanone is recovered by evaporating the ether.

The esters produced in Example 1(B) may be reacted in accordance with the above procedure of Example 1(C) to produce the following indanones:

1-(4'-methylthiobenzylidene)-2-methyl-5-chloro-3-indanone;
1-(4'-methylthiobenzylidene)-2-methyl-5-methoxy-6-fluoro-3-indanone;
1-(4'-methylthiobenzylidene)-2-methyl-5,7-difluoro-3-indanone; and
1-(4'-methylthiobenzylidene)-2-methyl-5,6-difluoro-3-indanone.

(D) Ethyl-1-(4'-methylthiobenzylidene)-3-hydroxy-2-methyl-5-fluoro-3-indanyl acetate A solution of 59.7 g. (0.2 mole) 1-(4'-methylthiobenzylidene)-2-methyl-5-fluoro-3-indanone and 44 g. ethyl bromoacetate in 120 ml. benzene is added over a period of 15 minutes to 55 g. zinc amalgam (prepared according to Organic Syntheses Coll., vol. 3, p. 786) in 280 ml. benzene and 100 ml. dry ether. A little iodine is introduced to start the reaction and the mixture is kept at gentle reflux with aid of external heating. At 3 hour intervals, two batches of 25 g. zinc amalgam and 29 g. bromo ester are added and refluxing is afterward maintained for 8 hours. Thereafter, 80 ml. ethanol and 400 ml. glacial acetic acid are introduced, and the mixture is poured into 2 liters 1:1 aqueous acetic acid. The organic layer is separated and the aqueous layer is extracted twice with ether. The combined organic layers are washed with water, aqueous ammonia, and water until neutrality is reached. The extract is dried over anhydrous magnesium sulfate, solvents are removed in vacuo at 80°, leaving crude ethyl 1 - (4' - methylthiobenzylidene)-3-hydroxy-2-methyl-5-fluoro-3-indanyl acetate.

The indanones produced in Example 1(C) may be reacted in accordance with the above procedure of Example 1(D) to produce the following indanyl esters:

Ethyl-1-(4'-methylthiobenzylidene)-3-hydroxy-2-methyl-5-chloro-3-indanyl acetate;
Ethyl - 1-(4'-methylthiobenzylidene)-3-hydroxy-2-methyl-5-methoxy-6-fluoro-3-indanyl acetate;
Ethyl - 1-(4'-methylthiobenzylidene)-3-hydroxy-2-methyl-5,7-difluoro-3-indanyl acetate; and
Ethyl - 1-(4'-methylthiobenzylidene)-3-hydroxy-2-methyl-5,6-difluoro-3-indanyl acetate.

When ethyl-α-bromopropionate is used in the above procedure of Example 1(D), the corresponding ethyl-α-propionates are obtained.

(E) 1-(p-methylthiobenzylidene)-2-methyl-5-fluoro-3-indenylacetic acid

Crude ethyl-1-(4'-methylthiobenzylidene)-3-hydroxy-2-methyl-5-fluoro-3-indanylacetate is mixed with 50 g. p-toluenesulfonic acid (tosic acid) monohydrate and 50 g. anhydrous calcium chloride in 600 ml. toluene and refluxed overnight in an assembly containing a trap for liberated water. The reaction mixture is filtered, and the solids are washed with benzene. The combined organic extract is washed with water, aqueous sodium carbonate solution, water and finally dried over anhydrous magnesium sulfate. After removal of solvents under reduced pressure, the ethyl ester is saponified with aqueous-alcoholic sodium hydroxide under gentle heating, and the free acid is liberated with excess 2.5 N sulfuric acid. The precipitate is filtered, redissolved in aqueous ethanol (v.:v. under heating), decolorized with charcoal, and brought to crystallization to recover the above acid in pure form.

The indanyl esters produced in Example 1(D) may be reacted in accordance with the above procedure of Example 1(E) to produce the following acids:

1-(p-methylthiobenzylidene)-2-methyl-5-chloro-3-indenylacetic acid;
1-(p-methylthiobenzylidene)-2-methyl-5-methoxy-6-fluoro-3-indenylacetic acid;
1-(p-methylthiobenzylidene)-2-methyl-5,7-difluoro-3-indencylacetic acid;
1-(p-methylthiobenzylidene)-2-methyl-5,6-difluoro-3-indencylacetic acid;

and the corresponding α-propionic acids.

(F) 5-fluoro-2-methyl-1-(p-methylsulfinylbenzylidene)-3-indenylacetic acid

To a solution of 5-fluoro-2-methyl-1-(p-methylthiobenzylidene)-3-indenylacetic acid (3.4 g., 0.01 mole) in a mixture of methanol (250 ml.) and acetone (100 ml.) is added a solution of sodium periodate (3.8 g., 0.018 mole) in water (50 ml.) with stirring.

Water (450 ml.) is added after 18 hours and the organic solvents removed under vacuum below 30°. The precipitated product is filtered, dried and recrystallized from ethyl acetate to give 5-fluoro-2-methyl-1-(p-methylsulfinylbenzylidene)-3-indenylacetic acid, M.P. 184–186°. U.V. in methanol: $\lambda_{max.}$ 328 (E percent 3777), 286 (432), 257.5 shldr. (413), 227 (548).

The acids produced in Example 1(F) may be reacted in accordance with the above procedure of Example 1(F) to produce the following acids:

1-(4'-methylsulfinylbenzylidene)-2-methyl-5-chloro-3-indenylacetic acid;
1-(4'-methylsulfinylbenzylidene)-2-methyl-5-methoxy-6-fluoro-3-indenylacetic acid;
1-(4'-methylsulfinylbenzylidene)-2-methyl-5,7-difluoro-3-indenylacetic acid;
1-(4'-methylsulfinylbenzylidene)-2-methyl-5,6-difluoro-3-indenylacetic acid;

and the corresponding α-propionic acids.

These acids may be further oxidized by procedures well known in the art to produce the corresponding 1-(4'-methylsufonylbenzyidene)-3-indenylacetic (or propionic) acids.

EXAMPLE 2

(A) 4-methylthiobenzyl-4'-fluorophenyl ketone

A solution of 48 g. (0.05 mole) fluorobenzene and 47 g. (0.25 mole) 4-methylthiophenylacetyl chloride in 500 ml. dry carbon disulfide is treated under stirring with 70 g. anhydrous aluminum chloride and allowed to remain for 24 hours at room temperature, at which time evolution of hydrogen chloride has ceased. Carbon disulfide and excess fluorobenzene are removed by distillation on the steam cone, and the residue is quenched in ice-water. The organic fraction is extracted with methylene chloride, dried over anhydrous calcium sulfate and distilled under reduced pressure to yield anhydrous calcium sulfate and distilled under reduced pressure to yield analytically pure 4-methylthiobenzyl-4'-fluorophenyl ketone.

The reactions of Example 2(A) are repeated using the same reaction conditions and techniques. Using the starting materials of Table I there are obtained the products on Table II.

| Table I | Table II |
|---|---|
| Chlorobenzene | 4-methylthiobenzyl-4' - chlorophenyl ketone. |
| o-Fluoranisole | 4-methylthiobenzyl-3' - fluoro-4'-methoxyphenyl ketone. |
| m-Difluorobenzene | 4-methylthiobenzyl - 2',4' - difluorophenyl ketone. |
| o-Difluorobenzene | 4-methylthiobenzyl - 3',4' - difluorophenyl ketone. |

(B) Ethyl-3-oxo-5-hydroxy-4-methyl-[5-(4'-fluoro)-6-(4''-methylthio)]-diphenylcaproate In a 500 ml. flask fitted with stirrer, reflux condenser, and dropping funnel, is placed 19.7 g. (0.3 gram-atom) zinc dust. The dropping funnel is charged with a mixture of 100 ml. anhyrous benzene, 20 ml. absolute ethtr, 78.0 g. 4-methylthiobenzyl-4'-fluorophenyl ketone and 68.0 g. (0.3 mole) ethyl-3-oxo-4-bromovalerate. About 15 ml. of the mixture is added to the zinc dust under vigorous stirring, and the flask is warmed until the reaction starts. The external heat is then withdrawn and the remainder of the reactants are introduced dropwise at such a rate as to maintain moderate refluxing. When the spontaneous reaction has subsided, heat is reapplied so as to maintain refluxing for another 30 minutes. The flask contents are cooled in ice and quenched with 150 ml. 10% sulfuric acid. The non-aqueous phase is separated, washed twice with 30 ml. portions of 5% sulfuric acid, then twice with 30 ml. portions of water. The aqueous phases are combined and shaken with two 30 ml. portions of ether. All organic extracts are thereafter combined and dried over anhydrous sodium sulfate. Evaporation of solvent and fractional distillation of the residue at 0.1 mm. yields pure ethyl-3-oxo-5-hydroxy-4-methyl-[5-(4'-fluoro) - 6 - (4''-methylthio)]-diphenylcaproate.

The ketones produced in Example 2(A) may be reacted in accordance with the above procedure of Example 2(A) to produce the following diphenylcaproate:

Ethyl-3-oxo-5-hydroxy-2-methyl-[5-(4'-chloro)-6-(4''-methylthio)]-diphenylcaproate;
Ethyl-3-oxo-5-hydroxy-2-methyl-[5-(3'-methoxy-4'-fluoro)-6-(4''-methylthio)]-diphenylcaproate;
Ethyl-3-oxo-5-hydroxy-2-methyl-[5-(2',4'-difluoro)-6-(4''-methylthio)]-diphenylcaproate; and
Ethyl-3-oxo-5-hydroxy-2-methyl-[5-(3',4'-difluoro)-6-(4''-methylthio)]-diphenylcaproate.

(C) 1-(4'-methylthiobenzylidene)-2-methyl-5-fluoro-3-indenyl acetic acid

Ethyl-3-oxo-5-hydroxy-4-methyl-[5-(4'-fluoro)-6 - (4''-methylthio)]-diphenylcaproate (40.4 g., 0.1 mole) is added to 185 g. polyphosphoric acid at 50° and the mixture is heated at 80–90° for 2 hours. The syrup is poured into ice-water, stirred for 0.5 hour, and then extracted with ether 3 times. The ether solution is washed twice with water and then with 5% sodium bicarbonate until the ether phase is neutral. The ether extract is concentrated on the steam cone and the residue is saponified by heating under gentle reflux with aqueous-alcoholic 3 N sodium hydroxide. After cooling, the solution is acidified with 2.5 N sulfuric acid, the alcohol is removed under vacuum and the precipitated acid is recrystallized from aqueous alcohol.

The diphenylcaproates product in Example 2(B) may be reached in accordance with the above procedure of Example 2(C) to produce the following acids:

1-(4'-methylthiobenzylidene)-2-methyl-5-chloro-3-indenylacetic acid;
1-(4'-methylthiobenzylidene)-2-methyl-5-methoxy-6-fluoro-3-indenylacetic acid;
1-(4'-methylthiobenzylidene)-2-methyl-5,7-difluoro-3-indenylacetic acid;
1-(4'-methylthiobenzylidene)-2-methyl-5,6-difluoro-3-indenylacetic acid;

and the corresponding α-propionic acids.

(D) 5-fluoro-2-methyl-1-(p-methylsulfinylbenzylidene)-3-indenylacetic acid

To a solution of 5-fluoro-2-methyl-1-(p-methylthiobenzylidene)-3-indenylacetic acid (3.4 g., 0.01 mole) in a mixture of methanol (250 ml.) and acetone (100 ml.) is added a solution of sodium periodate (3.8 g., 0.018 mole) in water (50 ml.) with stirring.

Water (450 ml.) is added after 18 hours and the organic solvents removed under vacuum below 30°. The precipitated product is filtered, dried and recrystallized from ethyl acetate to give 5-fluoro-2-methyl-1-(p-methylsulfinylbenzylidene)-3-indenylacetic acid, M.P. 184–186°. U.V. in methanol: $\lambda_{max.}$ 328 (E percent 377), 286 (432), 257.5 shldr. (413), 227 (548).

The acids produced in Example 2(D) may be reacted in accordance with the above procedure of Example 2(D) to produce the following acids:

1-(p-methylsulfinylbenzylidene)-2-methyl-5-chloro-3-indenylacetic acid;
1-(p-methylsulfinylbenzylidene)-2-methyl-5-methoxy-6-fluoro-3-indenylacetic acid;

1-(p-methylsulfinylbenzylidene)-2-methyl-5,7-difluoro-3-indenylacetic acid;

1-(p-methylsulfinylbenzylidene)-2-methyl-5,6-difluoro-3-indenylacetice acid;

and the corresponding α-propionic acids.

These acids may be further oxidized by procedures well known in the art to produce the corresponding 1-(4'-methylsulfonylbenzylidene)-3-indenylacetic (or propionic) acids.

EXAMPLE 3

(A) 4-methylsulfinylbenzyl,4'-fluorophenyl ketone

A solution of 48 g. (0.5 mole) fluorobenzene and 47 g. (0.25 mole) 4-methylsulfinylphenylacetyl chloride in 500 ml. dry carbon disulfide is treated under stirring with 70 g. anhydrous aluminum chloride and allowed to remain for 24 hours at room temperature, at which time evolution of hydrogen chloride has ceased. Carbon disulfide and excess fluorobenzene are removed by distillation on the steam cone, and the residue is quenched in ice-water. The organic fraction is extracted with methylene chloride, dried over anhydrous calcium sulfate and distilled under reduced pressure to yield anhydrous calcium sulfate and distilled under reduced pressure to yield analytically pure 4-methylsulfinylbenzyl,4'-fluorophenyl ketone.

The reactions of Example 3(A) are repeated using the same reaction conditions and techniques. Using the starting material of Table I there are obtained the products of Table II.

| Table I: | Table II: |
|---|---|
| Chlorobenzene | 4-methylsulfinylbenzyl,4'-chlorophenyl ketone. |
| o-Fluoranisole | 4-methylsulfinylbenzyl,3'-fluoro,4'-methoxyphenyl ketone. |
| m-Difluorobenzene | 4-methylsulfinylbenzyl,2',4'-difluorophenyl ketone. |
| o-Difluorobenzene | 4-methylsulfinylbenzyl,3',4'-difluorophenyl ketone. |

(B) Ethyl-3-hydroxy-2-methyl-[-3-(4'-fluoro)-4-(4''-methylsulfinyl)]-diphenylbutyrate In a one liter flask fitted with stirrer, reflux condenser, and dropping funnel is placed 39.4 g. (0.6 gram-atom) zinc dust. The dropping funnel is charged with a mixture of 200 ml. anhydrous benzene, 40 ml. absolute ether, 156.1 g. (0.6 mole) 4-methylsulfinylbenzyl,4'-fluorophenyl ketone, and 108.5 g. ethyl-2-bromopropionate. Approximately 25 ml. water is added to the zinc dust under vigorous stirring and the flask is warmed until the reaction starts after which heat is withdrawn and the remainder of the reactants introduced dropwise at such a rate as to maintain moderate refluxing. When the spontaneous reaction has subsided, heat is reapplied so as to maintain refluxing for another 30 minutes. The flask contents are cooled in ice and quenched with 300 ml. 10% sulfuric acid. The nonaqueous layer is separated, washed twice with 60 ml. portions of 5% sulfuric acid, then twice with 60 ml. portions of water. The aqueous phases are combined and shaken with two 60 ml. portions of ether. All organic extracts are thereafter combined and dried over anhydrous sodium sulfate. Evaporation of solvent and fractional distillation of the residue at 0.1 mm. yields pure ethyl-3-hydroxy-2-methyl-[3-(4'-fluoro)-4-(4''-methylsulfinyl-)]-diphenylbutyrate.

The ketones produced in Example 3(A) may be reacted in accordance with the above procedure of Example 3(B) to produce the following esters:

Ethyl-3-hydroxy-2-methyl-[3-(4'-chloro)-4-(4''-methylsulfinyl-)]-diphenylbutyrate;

Ethyl-3-hydroxy-2-methyl-[3-(3'-fluoro-4'-methoxy)-4-(4''-methylsulfinyl-)]-diphenylbutyrate;

Ethyl-3-hydroxy-2-methyl-[3-2',4'-difluoro)-4-(4''-methylsulfinyl-)]-diphenylbutyrate; and Ethyl-3-hydroxy-2-methyl-[3-(3',4'-difluoro)-4-(4''-methylsulfinyl-)]-diphenylbutyrate.

(C) 1-(4'-methylsulfinylbenzylidene)-2-methyl-5-fluoro-3-indanone

Ethyl 3-hydroxy-2-methyl-[3-(4'-fluoro)-4-(4''-methylsulfinyl-)]-diphenylbutyrate (108.6 g., 0.3 mole) is added to 550 g. polyphosphoric acid at 50°, and the mixture is heated at 80–90° for 2 hours. The syrup is poured into ice-water, stirred for 0.5 hour, and then extracted with ether 3 times. The ether solution is washed twice with water and then with 5% sodium bicarbonate until the ether phase is neutral. The ether extract is dried over anhydrous sodium sulfate. The indanone is recovered by evaporating the ether.

The esters produced in Example 3(B) may be reacted in accordance with the above procedure of Example 3(C) to produce the following indanones:

1-(4'-methylsulfinylbenzylidene)-2-methyl-5-chloro-3-indanone;

1-(4'-methylsulfinylbenzylidene)-2-methyl-5-methoxy-6-fluoro-3-indanone;

1-(4'-methylsulfinylbenzylidene)-2-methyl-5,7-difluoro-3-indanone; and 1-(4'-methylsulfinylbenzylidene)-2-methyl-5,6-difluoro-3-indanone.

(D) Ethyl-1-(4'-methylsulfinylbenzylidene)-3-hydroxy-2-methyl-5-fluoro-3-indanyl acetate A solution of 59.7 g. (0.2 mole) 1-(4'-methylsulfinylidene)-2-methyl-5-fluoro-3-indanone and 44 g. ethyl bromoacetate in 120 ml. benzene is added over a period of 15 minutes to 55 g. zinc amalgam (prepared according to Organic Syntheses Coll., vol. 3, p. 766) in 280 ml. benzene and 100 ml. dry ether. A little iodine is introduced to start the reaction and the mixture is kept at gentle reflux with aid of external heating. At 3 hour intervals, two batches of 25 g. zinc amalgam and 29 g. bromo ester are added and refluxing is afterward maintained for 8 hours. Thereafter, 80 ml. ethanol and 400 ml. glacial acetic acid are introduced, and the mixture is poured into 2 liters 1:1 aqueous acetic acid. The organic layer is separated and the layer is extracted twice with ether. The combined organic layers are washed with water, aqueous ammonia, and water until neutrality is reached. The extract is dried over anhydrous magnesium sulfate, solvents are removed in vacuo at 80°, leaving crude ethyl 1-(4'-methylsulfinylbenzylidene)-3-hydroxy-2-methyl-5-fluoro-3-indanyl acetate.

The indanones produced in Example 3(C) may be reacted in accordance with the above procedure of Example 3(D) to produce the following indanyl esters:

Ethyl-1-(4'-methylsulfinylbenzylidene)-3-hydroxy-2-methyl-5-chloro-3-indanyl acetate;

Ethyl-1-(4'-methylsulfinylbenzylidene)-3-hydroxy-2-methyl-5-methoxy-6-fluoro-3-indanyl acetate;

Ethyl-1-(4'-methylsulfinylbenzylidene)-3-hydroxy-2-methyl-5,7-difluoro-3-indanyl acetate; and Ethyl-1-(4'-methylsulfinylbenzylidene)-3-hydroxy-2-methyl-5,6-difluoro-3-indanyl acetate.

When ethyl-α-bromopropionate is used in the above procedure of Example 1(D) the corresponding ethyl-α propionates are obtained.

(E) 1-(p-methylsulfinylbenzylidene)-2-methyl-5-fluoro-3-indenylacetic acid

Crude ethyl-1-(4'-methylsulfinylbenzylidene)-3-hydroxy-2-methyl-5-fluoro-3-indanylacetate is mixed with 50 g. p-toluenesulfonic acid (tosic acid) monohydrate and 50 g. anhydrous calcium chloride in 600 ml. toluene and refluxed overnight in an assembly containing a trap for liberated water. The reaction mixture is filtered, and the solids are washed with benzene. The combined organic extract is washed with water, aqueous sodium carbonate solution, water and finally dried over anhydrous magnesium sulfate. After removal of solvents under reduced pressure, the ethyl ester is saponified with aqueous-alcoholic sodium hydroxide under gentle heating, and the free acid is liberated with excess 2.5 N sulfuric acid. The precipitate is filtered, redissolved in aqueous ethanol (v.:v. under heating), decolorized with charcoal, and brought to crystallization to recover the above acid in pure form.

The indanyl esters produced in Example 3(D) may be reacted in accordance with the above procedure of Example 3(E) to produce the following acids:

1-(p-methylsulfinylbenzylidene)-2-methyl-5-methoxy-6-fluoro-3-indenylacetic acid;
1-(p-methylsulfinylbenzylidene)-2-methyl-5,7-difluoro-3-indenylacetic acid;
1-(p-methylsulfinylbenzylidene)-2-methyl-5,6-difluoro-2-indenylacetic acid;

and the corresponding α-propionic acids.

EXAMPLE 4

(A) 4-methylsulfinylbenzyl-4'-fluorophenyl ketone

A solution of 48 g. (0.05 mole) fluorobenzene and 47 g. (0.25 mole) 4-methylsulfinylphenylacetyl chloride in 500 ml. dry carbon disulfide is treated under stirring with 70 g. anhydrous aluminum chloride and allowed to remain for 24 hours at room temperature, at which time evolution of hydrogen chloride has ceased. Carbon disulfide and excess fluorobenzene are removed by distillation on the steam cone, and the residue is quenched in ice-water. The organic fraction is extracted with methylene chloride, dried over anhydrous calcium sulfate and distilled under reduced pressure to yield anhydrous calcium sulfate and distilled under reduced pressure to yield analytically pure 4-methylsulfinylbenzyl,4'-fluorophenyl ketone.

The reactions of Example 4(A) are repeated using the same reaction conditions and techniques. Using the starting materials of Table I there are obtained the products on Table II.

| Table I: | Table II |
|---|---|
| Chlorobenzene | 4-methylsulfinylbenzyl,-4'-chlorophenyl ketone. |
| o-Fluoranisole | 4-methylsulfinylbenzyl,3'-fluoro,4'-methoxyphenyl ketone. |
| m-Difluorobenzene | 4-methylsulfinylbenzyl,-2',4'-difluorophenyl ketone. |
| o-Difluorobenzene | 4-methylsulfinylbenzyl,-3',4'-difluorophenyl ketone. |

(B) Ethyl-3-oxo-5-hydroxy-4-methyl-[5-(4'-fluoro)-6-(4''-methylsulfinyl)]-diphenylcaproate In a 500 ml. flask fitted with stirred, reflux condenser, and dropping funnel, is placed 19.7 g. (0.3 gram-atom) zinc dust. The dropping funnel is charged with a mixture of 100 ml. anhydrous benzene, 20 ml. absolute ether, 78.0 g. 4-methylsulfinylbenzyl,4'-fluorophenyl ketone and 68.0 g. (0.3 mole) ethyl-3-oxo-4-bromovalerate. About 15 ml. of the mixture is added to the zinc dust under vigorous stirring, and the flask is warmed until the reaction starts. The external heat is then withdrawn and the remainder of the reactants are introduced dropwise at such a rate as to maintain moderate refluxing. When the spontaneous reaction has subsided, heat is reapplied so as to maintain refluxing for another 30 minutes. The flask contents are cooled in ice and quenched with 150 ml. 10% sulfuric acid. The non-aqueous phase is separated, washed twice with 30 ml. portions of 5% sulfuric acid, then twice with 30 ml. portions of water. The aqueous phases are combined and shaken with two 30 ml. portions of ether. All organic extracts are thereafter combined and dried over anhydrous sodium sulfate. Evaporation of solvent and fractional distillation of the residue at 0.1 mm. yields pure ethyl-3-oxo-5-hydroxy-4-methyl-[5-(4'-fluoro)-6-(4''-methylsulfinyl)]-diphenylcaproate.

The ketones produced in Example 4(A) may be reacted in accordance with the above procedure of Example 4(A) to produce the following diphenylcaproates:

Ethyl-3-oxo-5-hydroxy-2-methyl-[5-(4'-chloro)-6-(4''-methylsulfinyl-)]-diphenylcaproate;
Ethyl-3-oxo-5-hydroxy-2-methyl-[5-(3'-methoxy-4'-fluoro)-6-(4''-methylsulfinyl-)]-diphenylcaproate;
Ethyl-3-oxo-5-hydroxy-2-methyl-[5-(2',4'-difluoro)-6-(4''-methylthio-)]-diphenylcaproate; and
Ethyl-3-oxo-5-hydroxy-2-methyl-[5-(3',4'-difluoro)-6-4''-methylsulfinyl-)]-diphenylcaproate.

(C) 1-(p-methylsulfinylbenzylidene)-2-methyl-5-fluoro-3-indenyl acetic acid

Ethyl-3-oxo-5-hydroxy-4-methyl-[5-(4'-fluoro)-6-(4''-methylthio)]-diphenylcaproate (40.4 g., 0.1 mole) is added to 185 g. polyphosphoric acid at 50° and the mixture is heated at 80–90° for 2 hours. The syrup is poured into ice-water, stirred for 0.5 hour, and then extracted with ether 3 times. The ether solution is washed twice with water and then with 5% sodium bicarbonate until the ether phase is neutral. The ether extract is concentrated on the steam cone and the residue is saponified by heating under gentle reflux with aqueous-alcoholic 3 N sodium hydroxide. After cooling, the solution is acidified with 2.5 N sulfuric acid, the alcohol is removed under vacuum and the precipitated acid is recrystallized from aqueous alcohol.

The diphenylcaproates produced in Example 4(B) may be reacted in accordance with the above procedure of Example 4(C) to produce the following acids:

1-(p-methylsulfinylbenzylidene)-2-methyl-5-chloro-3-indenylacetic acid;
1-(p-methylsulfinylbenzylidene)-2-methyl-5-methoxy-6-fluoro-3-indenylacetic acid;
1-(p-methylsulfinylbenzylidene)-2-methyl-5,7-difluoro-3-indenylacetic acid;
1-(p-methylsulfinylbenzylidene)-2-methyl-5,6-difluoro-3-indenylacetic acid;

and the corresponding α-propionic acid.

What is claimed is:

1. A process of preparing compounds of the formula:

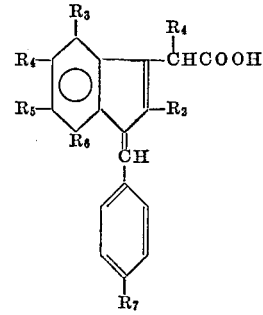

wherein:

$R_1$ may be hydrogen, loweralkyl or halogenated loweralkyl;

$R_2$ may be hydrogen or loweralkyl;

$R_3$, $R_4$, $R_5$ and $R_6$ each may be hydrogen, loweralkyl, loweralkoxy or halogen; and $R_7$ may be loweralkylsulfinyl or loweralkylsulfonyl;

which comprises:

(a) reacting a substituted phenylacetyl chloride with a substituted benzene to produce a substituted benzylphenyl ketone;

(b) condensing said ketone with an α-halopropionic ester to produce a 3-hydroxy-2-methyl-(substituted diphenyl)-butyrate;

(c) cyclizing said diphenyl butyrate to form a 1-(substituted benzylidene)-substituted-3-indanone;
(d) condensing said indanone with an α-haloalkanoic acid ester to form a 1-(substituted benzylidene)-3-hydroxy-3-(substituted indanyl) ester;
(e) dehydrating said indanyl ester to form a 1-(substituted benzylidene)-3-indenyl acetic acid ester; and
(f) saponifying said indenyl acetic acid ester to form a 1-(substituted benzylidene)-3-indenyl acetic acid.

2. A compound of the formula:

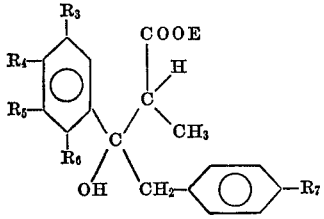

wherein:

$R_3$, $R_4$, $R_5$ and $R_6$ each may be hydrogen, loweralkyl, loweralkoxy or halogen;
$R_7$ may be loweralkylsulfinyl or loweralkylsulfonyl; and
E is loweralkyl.

3. A compound as in claim 2 wherein $R_3$ is hydrogen, $R_4$ is fluoro, $R_5$ is hydrogen, $R_6$ is hydrogen, $R_7$ is methylsulfinyl and E is loweralkyl.

References Cited
UNITED STATES PATENTS 3,312,730　4/1967　Winter et al. _____ 260—473 F LORRAINE A. WEINBERGER, Primary Examiner J. F. TERAPANE, Assistant Examiner U.S. Cl. X.R.

260—515 M, 520, 590; 424—308